No. 768,093. PATENTED AUG. 23, 1904.
E. R. THIERFELDER.
EMBROIDERY ATTACHMENT FOR KNITTING MACHINES.
APPLICATION FILED SEPT. 17, 1903.
NO MODEL. 11 SHEETS—SHEET 1.

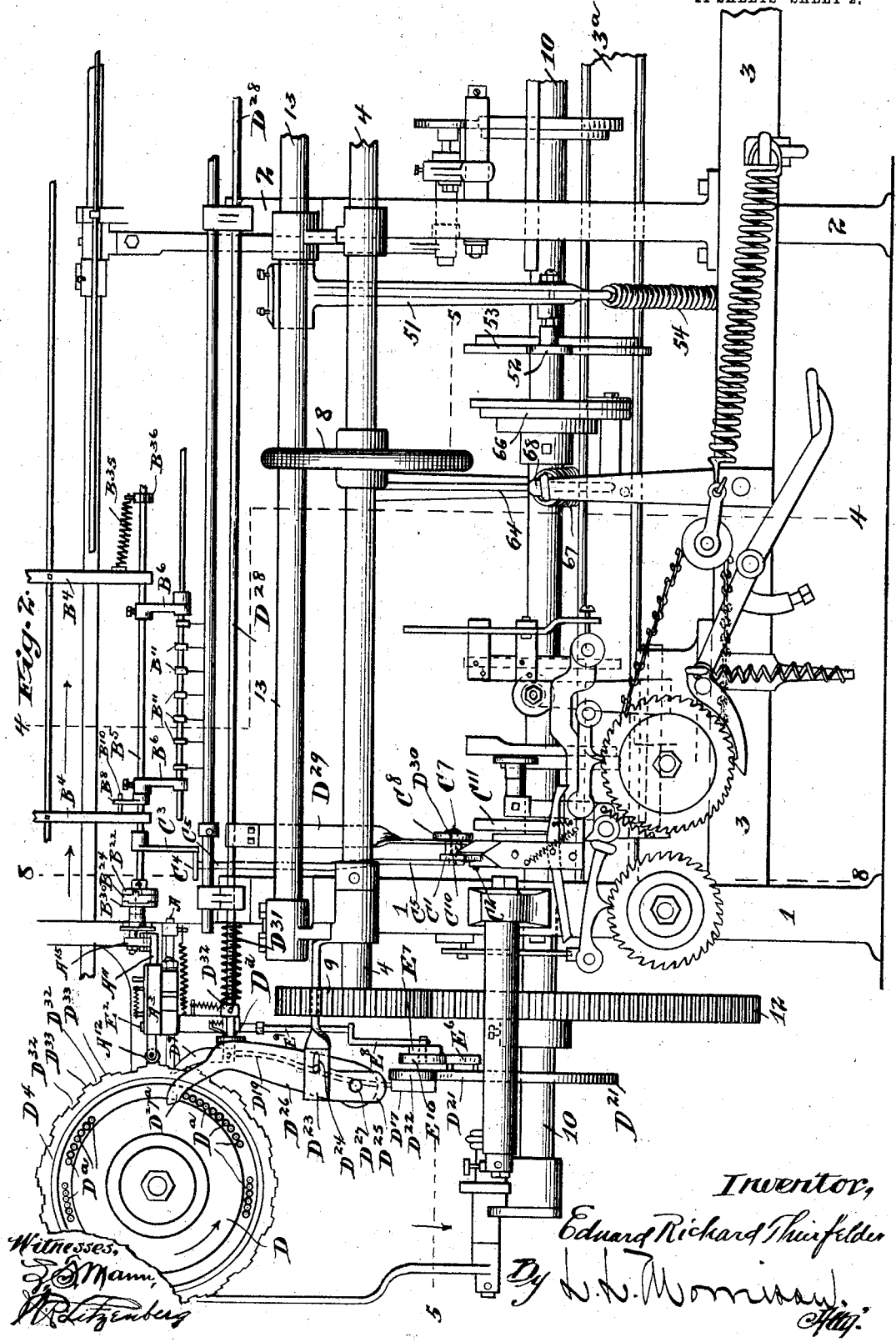

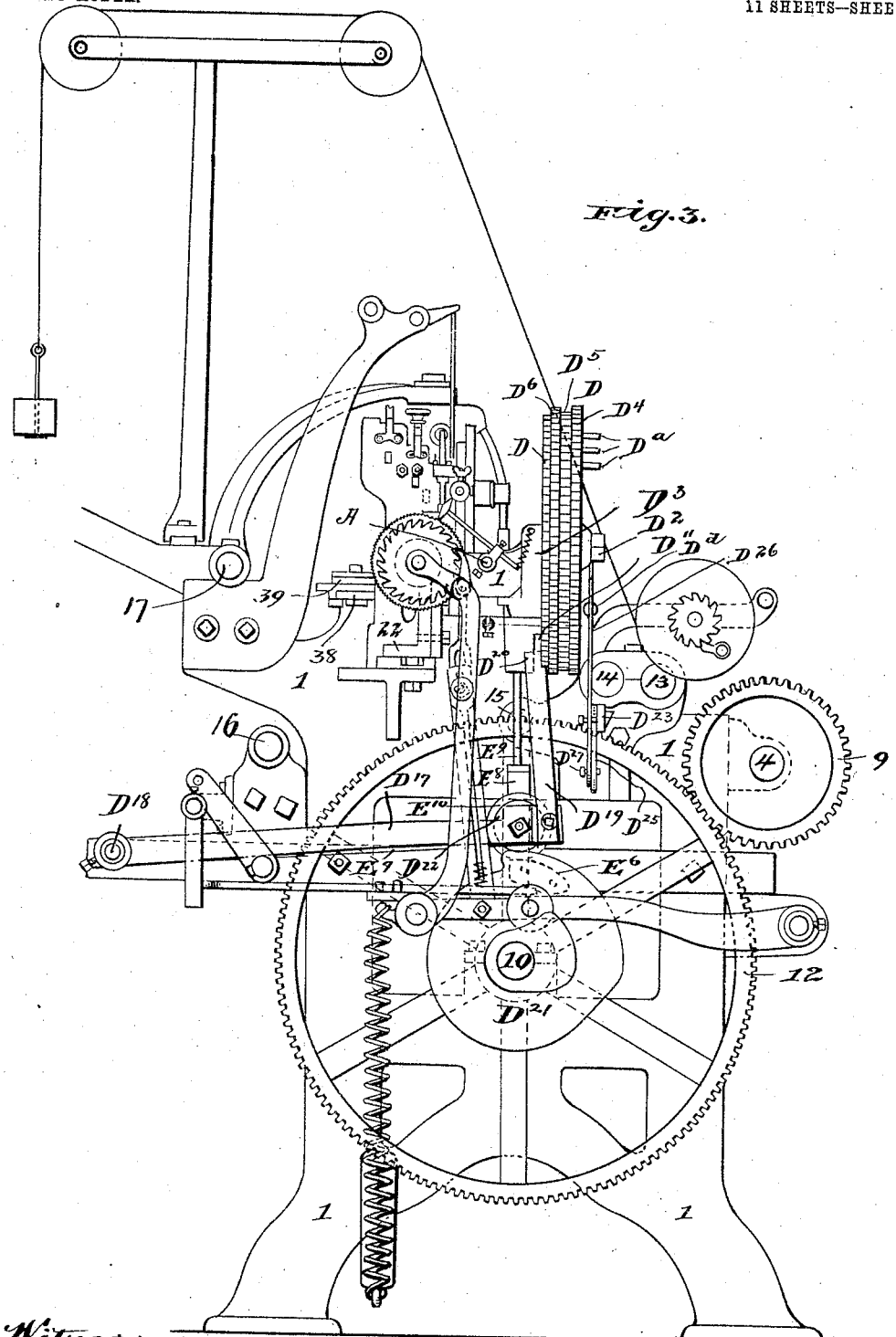

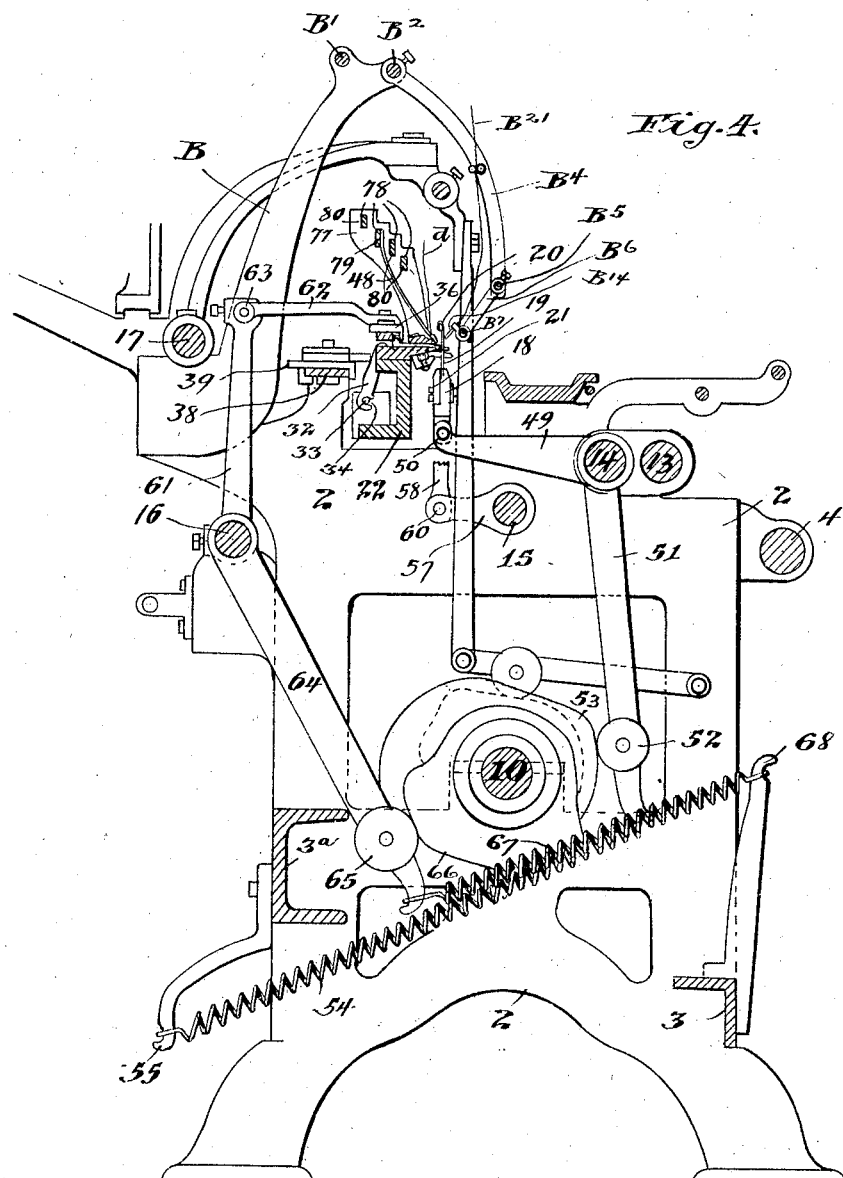

No. 768,093. PATENTED AUG. 23, 1904.
E. R. THIERFELDER.
EMBROIDERY ATTACHMENT FOR KNITTING MACHINES.
APPLICATION FILED SEPT. 17, 1903.
NO MODEL. 11 SHEETS—SHEET 5.
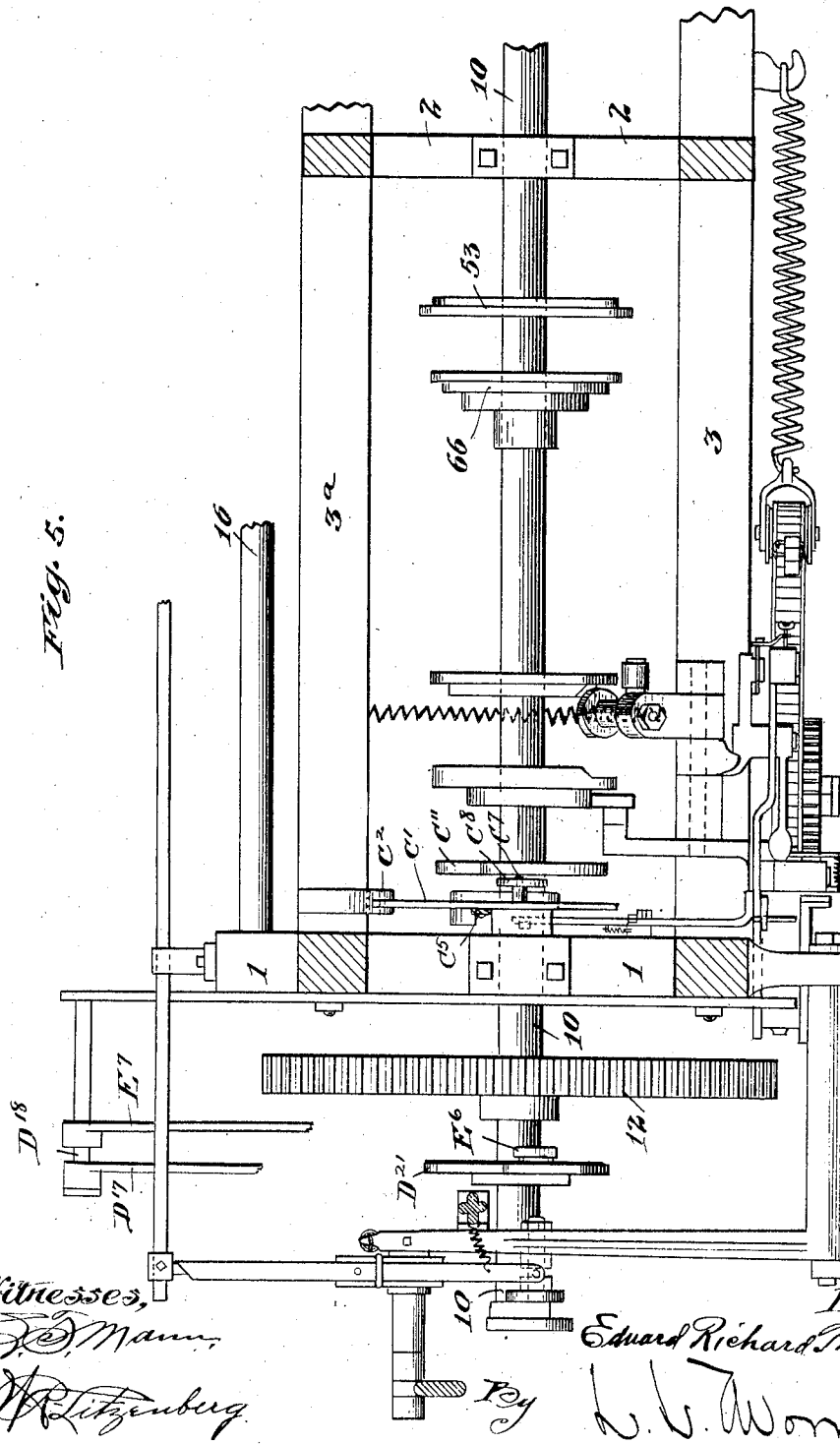

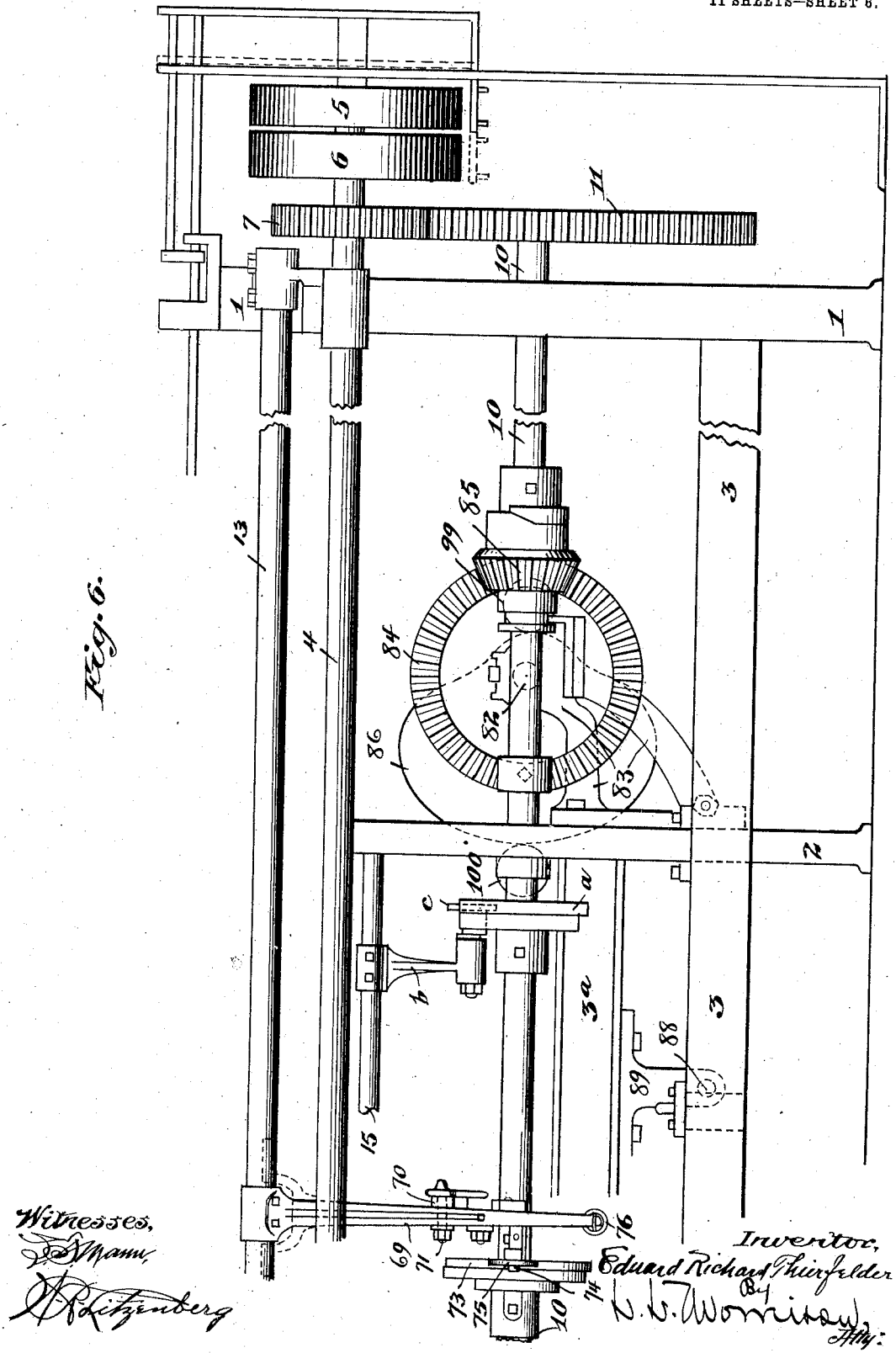

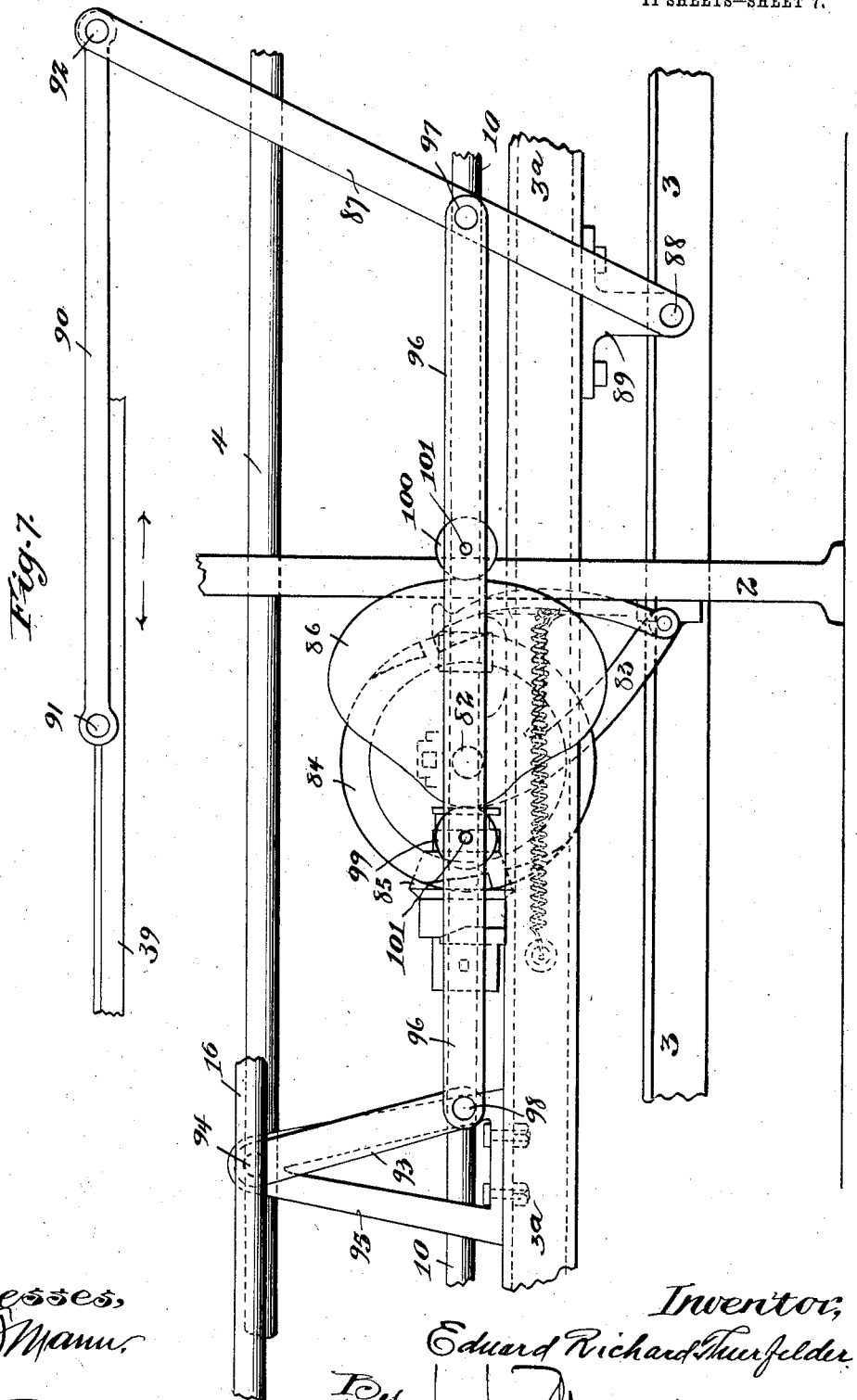

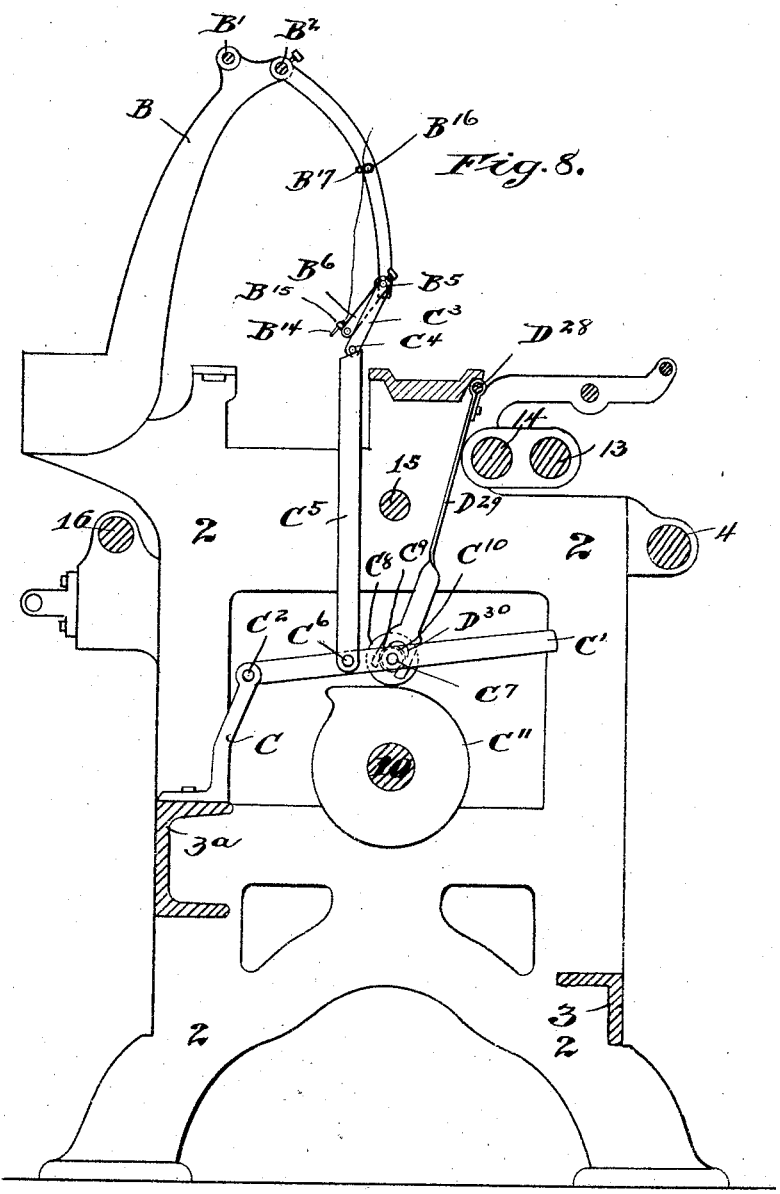

No. 768,093. PATENTED AUG. 23, 1904.
E. R. THIERFELDER.
EMBROIDERY ATTACHMENT FOR KNITTING MACHINES.
APPLICATION FILED SEPT. 17, 1903.
NO MODEL.
11 SHEETS—SHEET 9.
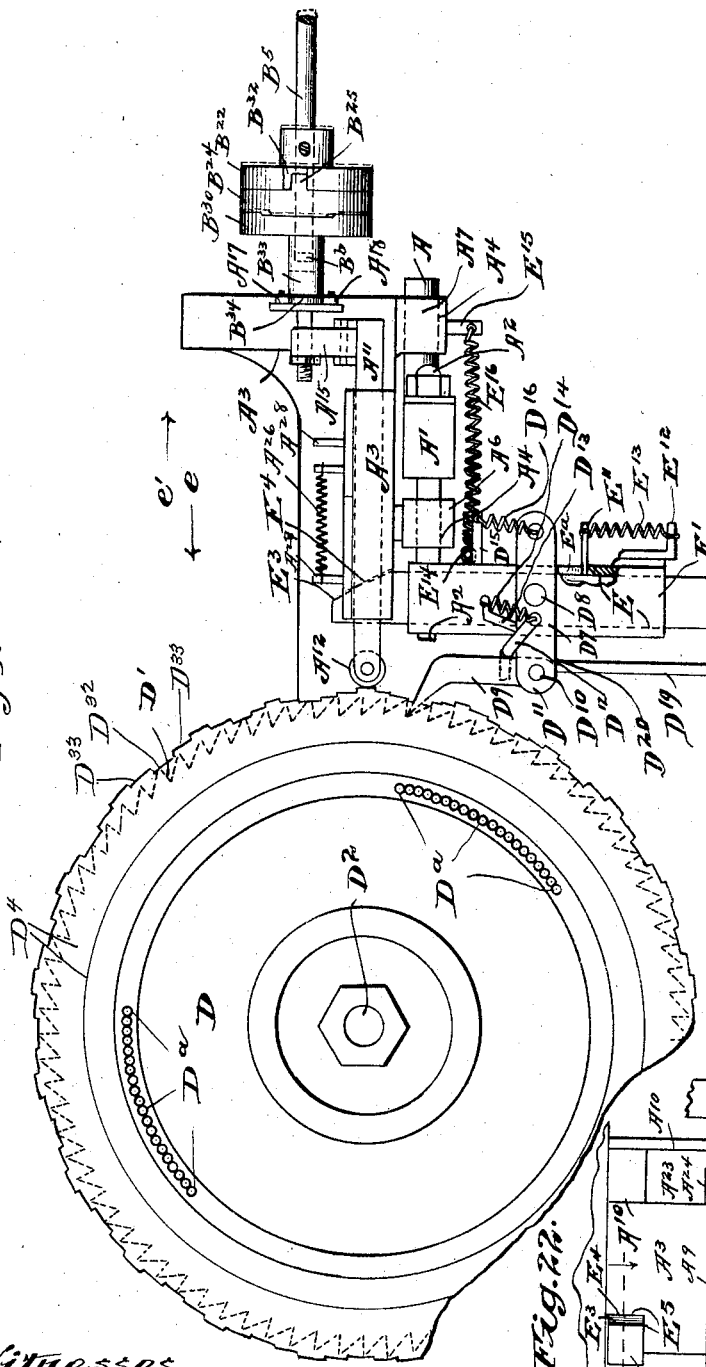
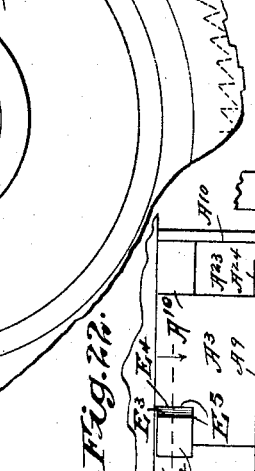
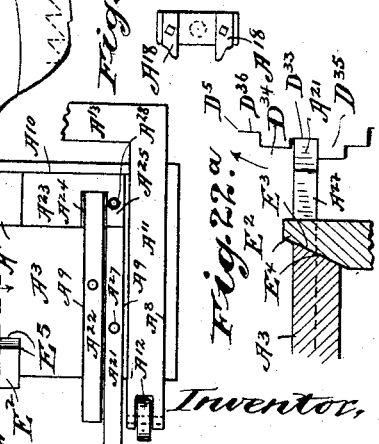
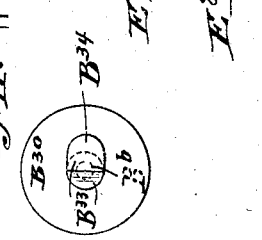
Witnesses,
Inventor,
Eduard Richard Thierfelder No. 768,093. PATENTED AUG. 23, 1904.
E. R. THIERFELDER.
EMBROIDERY ATTACHMENT FOR KNITTING MACHINES.
APPLICATION FILED SEPT. 17, 1903.
NO MODEL. 11 SHEETS—SHEET 10.
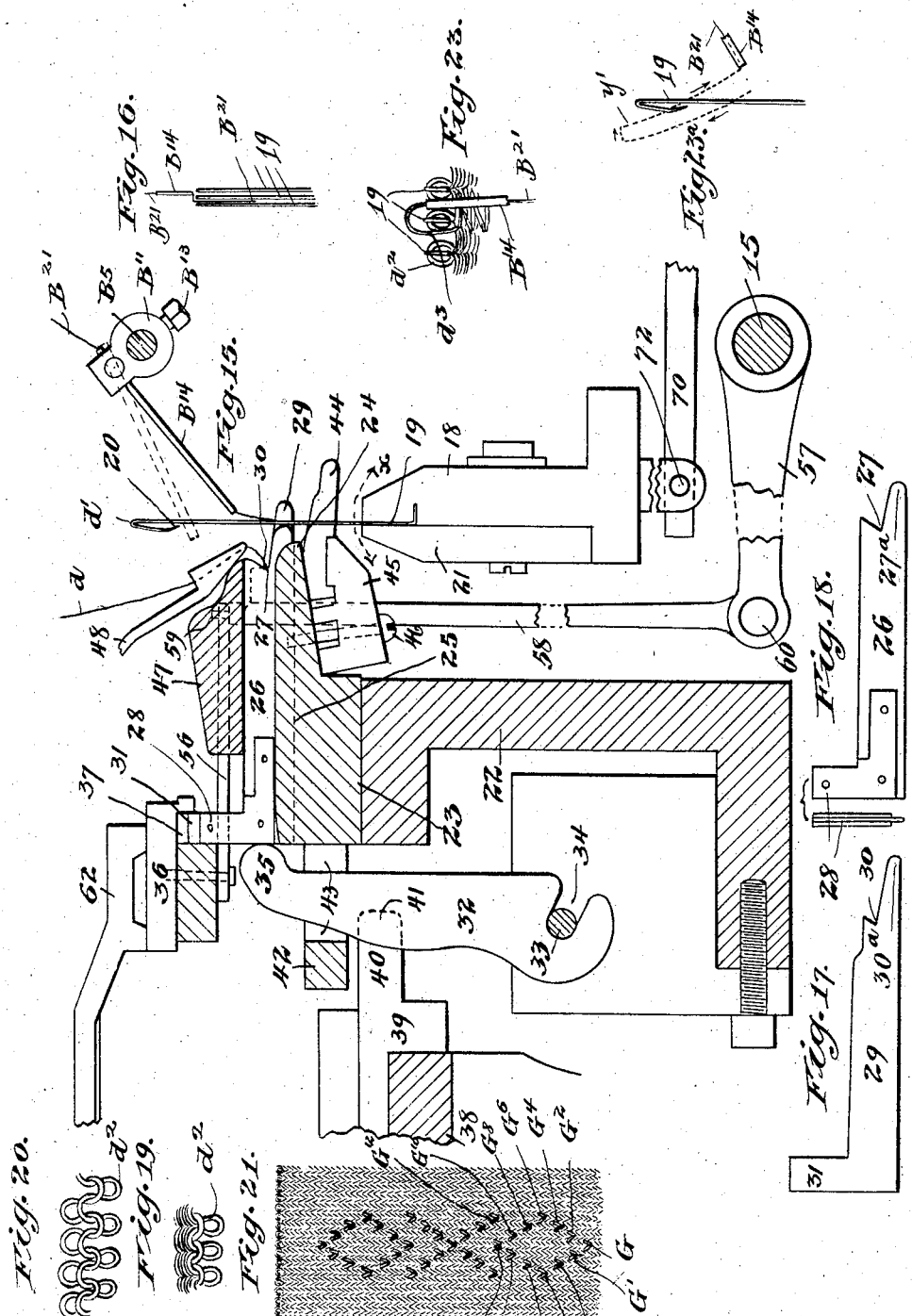
Witnesses,
Inventor,
Eduard Richard Thierfelder
By L. L. Morrow.
Atty.

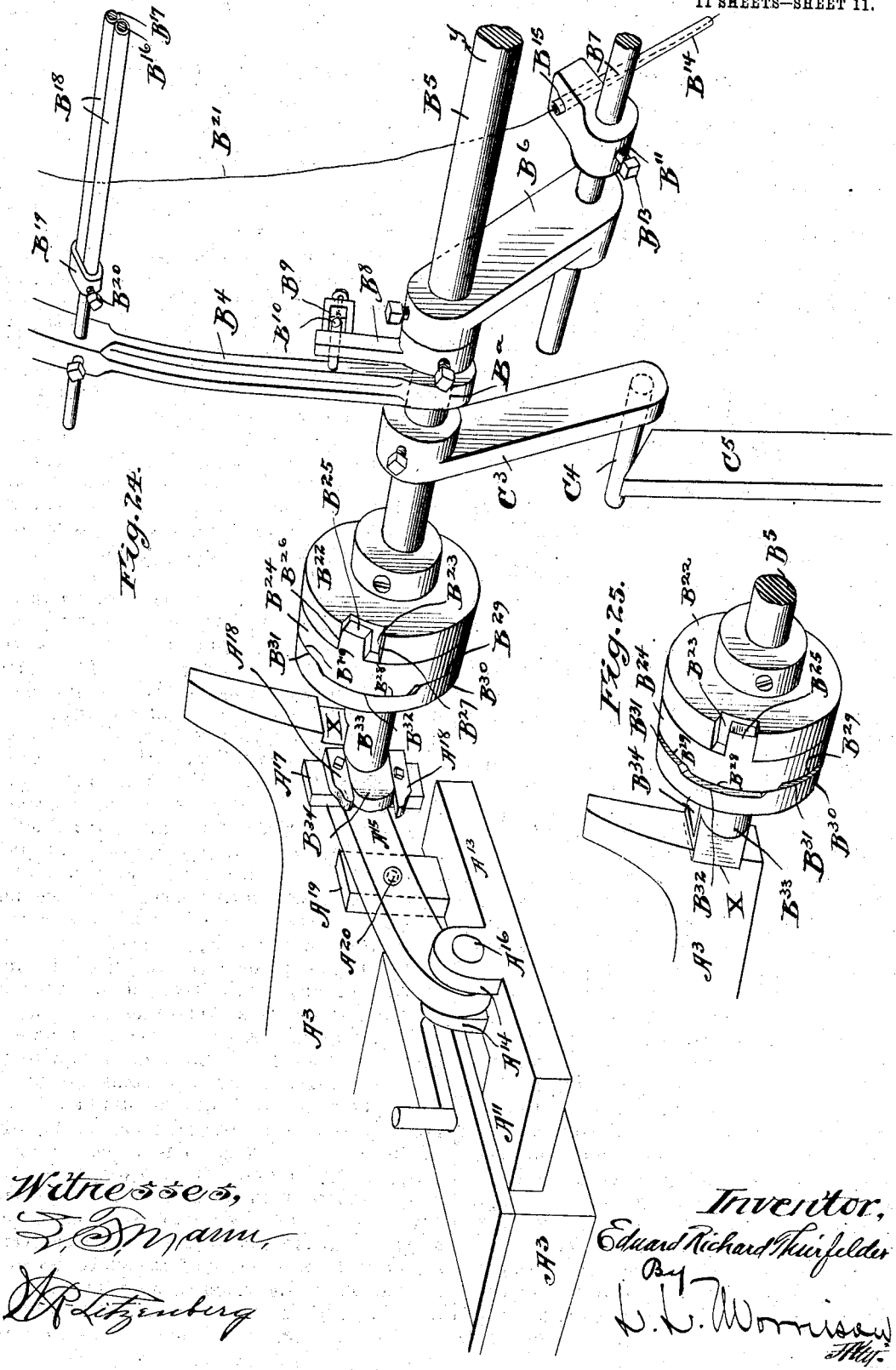

No. 768,093. Patented August 23, 1904.

UNITED STATES PATENT OFFICE.

EDUARD RICHARD THIERFELDER, OF KENOSHA, WISCONSIN.

EMBROIDERING ATTACHMENT FOR KNITTING-MACHINES.

SPECIFICATION forming part of Letters Patent No. 768,093, dated August 23, 1904.

Application filed September 17, 1903. Serial No. 173,523. (No model.)

*To all whom it may concern:*

Be it known that I, EDUARD RICHARD THIERFELDER, a subject of the Emperor of Germany, residing at Kenosha, in the county of Kenosha and State of Wisconsin, have invented certain new and useful Improvements in Embroidering Attachments for Knitting-Machines, of which the following is a specification.

My invention relates to mechanism for embroidering knit fabrics, most commonly stockings, with silk or other suitable material contemporaneously with the operation of knitting the fabric to be embroidered.

I accomplish my invention by devising mechanism consisting, most essentially, of tubes serving as conduits for embroidering-thread, provided with means for carrying such conduits with their threads alternately back and forth, behind, between, and around in front of the fabric-forming needles of the machine, together with a pattern-wheel and connecting devices extending from the embroidering-thread conduits into engagement with the pattern-wheel.

I have shown my attachment applied to and to some extent incorporated into a full-fashioned flat knitting-machine of the cotton type, having its fabric-forming needles arranged substantially vertically and all operative in the same plane. The machine to which I have shown it as being applied is very large and complicated, and I have therefore purposely had omitted from the drawings and description thereof nearly everything excepting the devices for producing such portions of stockings as are customarily embroidered, (the leg and instep portions thereof,) and with such knitting devices I have connected my embroidering attachment. Considerable portions of the narrowing mechanism of the machine have been shown in the drawings, as they could not well be omitted without representing the machine too much mutilated to illustrate my invention to the best advantage.

Referring to the accompanying drawings, which form a part of this specification, Figure 1 is a top plan view of an end section of a knitting-machine, which, however, for convenience, will generally be referred to hereinafter as a "knitting-machine" provided with my improvements. Fig. 2 is a front elevation of the same with some parts added thereto and others omitted therefrom. Fig. 3 is a left-hand end elevation of the machine substantially as it appears when complete in all its parts. Fig. 4 is a section at the dotted line 4 4 in Fig. 2 of parts there shown. Fig. 5 is a section at the dotted line 5 5 in Fig. 2 of parts there shown. Fig. 6 is a front elevation of an end section, the end opposite to that shown in Fig. 1, of the machine with parts omitted and other parts broken away. Fig. 7 is a rear elevation of parts of the same section of the machine that are shown in Fig. 6. Fig. 8 is a section at the dotted line 8 8 in Fig. 2 of parts there shown. Fig. 9 is an enlarged detail view of the pattern-wheel of the embroidering mechanism of the machine with parts for operating the same and other parts coöperating therewith. Figs. 10 to 14, inclusive, are enlarged detail views of cam devices for longitudinally sliding in one direction the rock-shaft carrying the embroidering-tubes of the embroidering attachment of the machine. Fig. 15 is an enlarged sectional detail of the knitting mechanism of the machine, showing one of the embroidering-tubes of the embroidering attachment thereof and the longitudinally-sliding rock-shaft which carries all of such tubes. Fig. 16 is a diagrammatic view of a group of three knitting-needles of the machine, showing an embroidering-tube carrying a thread of embroidering material around the central needle of such group. Figs. 17 and 18 are enlarged detail views of two slightly different species of sinker-slides belonging to the knitting mechanism of the machine and shown in operative connection therewith in Fig. 15. Figs. 19 and 20 are enlarged detail views showing a few rows of stitches of the fabric produced by the knitting mechanism of the machine. Fig. 21 is a detailed view showing the product of the machine having an ornamental pattern embroidered thereon. Fig. 22 is an enlarged detail top plan view of a part of the longitudinally-sliding carriage shown in Figs. 1 and 9 of the embroidering mechanism of the machine with its cover removed. Fig. 22$^a$ is a section at the dotted line 22$^a$ in Fig. 22 of parts there shown.

Fig. 23 is a diagrammatic view of a group of three knitting-needles of the machine represented as engaged in the operation of knitting a piece of fabric like that shown in Fig. 21 with one of the embroidering-tubes delivering a loop of embroidering-silk to the middle needle of the group in order that it may be knit into the fabric at the next descent of the needles to knit another row of stitches thereon. Fig. 23$^a$ is a diagrammatic view showing the path traveled by the free end of each embroidering-tube while placing a loop of embroidering material about one of the knitting-needles of the machine. Fig. 24 is an enlarged isometrical detail view illustrating one means of establishing operative connection between the pattern-wheel and embroidering-tubes of the embroidering mechanism of the machine. Fig. 25 is a like view showing another means of accomplishing the same thing.

Like characters of reference indicate corresponding parts throughout the several views.

1 represents the end pieces of the main frame of the machine and are substantially identical.

2 represents intermediate bents of the machine-frame, much resembling the parts 1 and arranged between and parallel thereto.

3 and 3$^a$ are bars extending the whole length of the machine-frame and are firmly secured to the parts 1 and 2.

The parts 1 and 2 are provided with several series of concentric transverse circular bearings for rotary and rock shafts extending longitudinally therethrough.

4, Fig. 6, is the driving-shaft of the machine and has mounted fast thereon a fast pulley 5, a loose pulley 6, a pinion 7, a hand-wheel 8, Fig. 2, and a pinion 9.

10 is the cam-shaft of the machine and has mounted fast thereon gear-wheels 11 and 12, Figs. 2 and 6, meshing with the pinions 7 and 9, respectively, of the driving-shaft, and numerous cams for operating the knitting, narrowing, and other mechanism of the machine. The above-mentioned cams are mounted generally in pairs on the cam-shaft 10, with the adjacent body portions of each pair in close contact and rigidly secured together.

13, 14, 15, 16, and 17, Fig. 3, are rock-shafts extending the whole length of the machine-frame and mounted in bearings therein. From these rock-shafts arms, fast thereto and having rollers mounted in the free ends thereof, project the peripheries of such rollers down into contact with or into the paths of the peripheries of the cams on the cam-shaft 10. The width of the periphery of each of such rollers is about equal to the width of the periphery of each of the cams composing one pair of the several pairs of cams mounted on the cam-shaft 10. The cam-shaft 10 may be shogged, at predetermined times or at will, endwise sufficiently to bring either cam of any one pair thereon under and into engagement with the roller mounted in the free end of the arm projecting downward and nearest thereto. This movement is insufficient to take out of mesh the gears 9 12 and 7 11.

18, Fig. 15, is a horizontal needle-bar extending the whole length of the machine.

19 is a full-sized needle, here shown to be of the latchless variety and terminating at its upper end portion in a downwardly-turned flexible point or beard 20. A series of needles 19, set vertically and arranged at proper intervals, are firmly clamped into the needle-bar 18 by means of the jaw 21.

22, Figs. 3 and 15, is a rigid angle-bar extending horizontally the whole length of the machine-frame and supported thereby, serving to support various parts of the machine.

23 is a horizontal bed-piece, preferably of brass, terminating at its free side in a somewhat blunt downwardly-sloping rectilinear edge 24 and having transverse parallel grooves 25, all of the same dimensions, sunk vertically thereinto. The grooves 25 are the same in number as the needles 19 of the machine, and the partitions between such grooves lie in the same vertical planes as their corresponding needles.

26, Figs. 15 and 18, is a longitudinally-slidable sinker having a thread carrying and evening notch 27 in and a finger-like portion 27$^a$ projecting from one end thereof and terminating at its other end in a transverse actuating-lug 28. One sinker, 26, is slidably seated in every alternate groove 25 in the bed-piece 23.

29 is also a longitudinally-slidable sinker having a thread carrying and evening notch 30 in and a finger-like portion 30$^a$ projecting from one end thereof and terminating at its other end in a transverse actuating-lug 31, somewhat longer than the corresponding lug 28 of the sinker 26. One sinker, 29, is slidably seated in each remaining groove 25 in the part 23—that is to say, a sinker 26 is set into a groove 25 and then a sinker 29 is set into the next adjacent groove 25, and so on until the grooves 25 are all occupied by such alternating sinkers.

32 is a sinker-jack mounted on the horizontal stationary rod-bearing 33 by means of the transverse slot 34 therein. The jacks 32 are located immediately behind the sinkers 26, and the edges of their free ends 35 rest against and are constantly in contact with the rear ends thereof.

36 is a sinker-controlling bar as long as the machine and having a rectilinear groove 37 in the under side thereof to admit the lugs 31 of the sinkers 29, which are continuously in engagement therewith. The lugs 28 of the sinkers 26 are also engaged by the groove 37 in the sinker-controlling bar 36 to draw such sinkers 26 backward each time after they have been advanced by their jacks 32, as will be explained hereinafter.

38, Figs. 3 and 15, is a horizontal track as long as and rigidly connected with the frame of the machine.

39 is a carriage slidably mounted on the track 38 and provided with transverse fingers 40, having tapering cam-surfaces (not shown) on the sides nearest to the observer of the free ends 41 thereof to press against and slide the jacks 32 and their sinkers 26 forward at proper times.

42 is a comb as long as the machine-frame, with which it is rigidly connected, and provided with transverse vertical guide-teeth 43, between two of which each jack 32 projects somewhat loosely.

44 represents knocking-over bits, which are equal in number to and lie in the same vertical planes with the slidable sinkers 26 and 29 and are rigidly clamped against the bottom of the bed-piece 23 by means of the long bracket 45 and screws 46.

47 is a stationary keeper which serves to maintain the slidable sinkers 26 and 29 all at the same level in their grooves 25 in the bed-piece 23.

48 is the knitting-thread carrier of the machine and is connected intermediately with the slidable carriage 39 on the track 38.

49, Fig. 4, is an arm rigidly secured by one end to the rock-shaft 14 and jointed by the other end and by means of the pivot 50 to the needle-bar 18.

51 is an arm rigidly secured by its upper end to the rock-shaft 14 and having a roller 52 mounted on the lower end portion thereof.

53, Figs. 2 and 4, is a cam on the cam-shaft 10, which, acting through the roller 52, arm 51, rock-shaft 14, and arm 49, carries the needle-bar 18 and its needles 19 alternately up and down at each rotation of such shaft 10 while the operation of knitting is going on.

54 is a tension-spring connecting the lower end of the arm 51 with a fixed bearing 55 on the frame 1 and serving to maintain the roller 52 in engagement with the cam 53.

56, Fig. 15, is an arm rigidly secured by one end to the bottom of the sinker-controlling bar 36.

57, Figs. 4 and 15, is an arm rigidly secured by one end to the rock-shaft 15.

58 is a link jointed by its upper end and by means of a pivot 59 to the free end of the arm 56 and by its lower end and by means of a pivot 60 to the free end of the arm 57. The rock-shaft 15 is actuated by means of a cam $a$, Fig. 6, on the cam-shaft 10 and an arm $b$, fast to such rock-shaft 15 and carrying a roller $c$ in its free end projected against such cam $a$ on the cam-shaft 10. The rock-shaft 15, so actuated and itself acting through the arm 57, Figs. 4 and 15, link 58, and arm 56, imparts alternately downward and upward movements to the sinker-controlling bar 36.

61, Fig. 4, is an arm rigidly secured by its lower end to the rock-shaft 16.

62 is an arm rigidly secured by one end to the sinker-controlling bar 36 and jointed by its other end and by means of a pivot 63 to the upper end of the arm 61.

64 is an arm rigidly secured by its upper end to the rock-shaft 16 and having a roller 65 mounted on the lower end portion thereof.

66, Figs. 2 and 4, is a cam on the cam-shaft 10, which, acting through the roller 65, arm 64, rock-shaft 16, arms 61 and 62, moves the sinker-controlling bar 36 alternately forward and backward at each rotation of such cam-shaft 10 while the operation of knitting is going on.

67 is a tension-spring connecting the lower end of the arm 64 with a fixed bearing 68 on the machine-frame and serving to maintain the roller 65 in engagement with the cam 66.

69, Fig. 6, is an arm rigidly secured by its upper end to the rock-shaft 13.

70, Figs. 6 and 15, is a link jointed by one end and by means of a pivot 71 to the arm 69 and by its other end and by means of a pivot 72 to the lower edge of needle-bar 18 produced.

73, Fig. 6, is a cam on the cam-shaft 10.

74 is an arm rigidly secured to and projecting transversely from the arm 69.

75 is a roller mounted on the free end of the arm 74 and engaging the cam 73 on the shaft 10.

76 is a tension-spring serving to maintain the roller 75 in engagement with the cam 73.

At each rotation of the cam-shaft 10 the cam 73, Fig. 6, acting through the roller 75, arm 69, and link 70, swings the upper edge of the needle-bar 18, Fig. 15, first toward and then from the edge 24 of the bed-piece 23, as indicated by the double arrow $x$, for a purpose to be explained hereinafter.

77, Fig. 4, represents vertical arms (one only being shown) rigidly secured to the angle-bar 22 and having four rectangular openings 78 therein serving as slideways for parts to be described hereinafter.

79 and 80, Fig. 1, are rectangular rods, approximately as long as the machine-frame, slidably mounted in the openings 78 in the vertical arms 77, Fig. 4. The rod 79 supports the carriers 48, Figs. 4 and 15, that conduct and pay out the threads that are to form the foot and leg portions of the stockings being knit, and the remaining three rods, 80, conduct and pay out the threads employed in forming the heels thereof. The rods 79 and 80 are all intermediately and rigidly connected with the slidable carriage 39, Figs. 3, 7, and 15, on the track 38 by connecting means therefor (not shown) projecting upward from such carriage 39 into engagement with such rods 79 and 80.

81, Fig. 1, represents screw-stops for regulating the travel (longitudinal reciprocations) of the rods 79 and 80. The other end of the machine is also provided with such stops. (Not shown.)

82, Figs. 6 and 7, is a short shaft mounted in bearings in the bracket 83 and on the bar 3ª of the machine-frame.

84, Fig. 6, is a bevel gear-wheel fast mounted on the end of the shaft 82 nearest to the observer.

85 is a bevel-pinion fast mounted on the shaft 10 and meshing with the bevel gear-wheel 84.

86, Figs. 6 and 7, is a cam fast mounted on the end of the shaft 82 opposite to that on which the gear-wheel 84 is mounted and parallel thereto.

87, Fig. 7, is an arm jointed at its lower end and by means of a pivot 88 to the hanger-bearing 89 on the bar 3ª of the machine-frame.

90 is a pitman jointed at one end and by means of a pivot 91 to the carriage 39 and at its other end and by means of a pivot 92 to the upper end of the arm 87.

93 is an arm jointed at its upper end and by means of a pivot 94 to the upper end of the tower-bearing 95 on the bar 3ª of the machine-frame.

96 is a link jointed at one end and by means of a pivot 97 to the arm 87 at a point between its ends and at the other end and by means of a pivot 98 to the lower end of the arm 93.

99 and 100 are rollers mounted on transverse rigid stud-bearings 101 on the link 96 and are alternately engaged by the cam 86 at each rotation thereof. Each rotation of the bevel gear-wheel 84 and the cam 86 slides the carriage 39 and all the parts carried thereby back and forth once.

Disregarding all movements of the machine parts, excepting only those required to produce such portions of stockings as are customarily embroidered—that is, the leg and instep portions thereof—its mode of operation, supposing power to be applied to the shaft 4 and communicated thence to the respective devices required to be actuated in order to produce such portions of stockings as are above proposed, will be as follows: The knitting-thread carrier 48 will pay out a thread $d$, Figs. 4 and 15, transversely across the upper edges of the finger-like portions 27ª and 30ª, Figs. 15, 17, and 18, of the sinkers 26 and 29. As such thread is thus payed out the carriage 39, being slid along its track 38, forces the cam-surfaces (not shown) on the portions 41 of the fingers 40 against the upper and free ends of the jacks 32, which are thereby impelled against and caused to slide all the sinkers 26 forward until the notches 27 therein engage the thread $d$ and press it transversely against and between every alternate needle 19. Immediately thereafter the cam 66, Fig. 4, acting through the roller 65, arm 64, rock-shaft 16, and arms 61 and 62, carries the sinker-controlling bar 36 and all the sinkers 29, Fig. 15, in engagement therewith forward until the notches 30 therein also engage the thread $d$ and press it transversely against and between every remaining alternate needle 19, the notches 27 and 30 in the sinkers 26 and 29 then all being and lying in and coinciding with one and the same straight line, and thereby serving to maintain the thread $d$ tautly and evenly against and between all the needles 19 of the machine. Thereupon the cam 53, Fig. 4, coacting with the spring 54 and roller 52 and through the arm 51, rock-shaft 14, and arm 49 lowers the needle-bar 18, Fig. 15, with its needles 19, until the beards 20 thereon are opposite to the edge 24 of the bed-piece 23, when the thread $d$ will be engaged by the hook portions $d'$ of such needles 19. Then the cam 73, Fig. 6, coacting with the spring 76 and roller 75 and through the arm 69 and link 70, Fig. 15, swings the upper edge of the needle-bar 18 toward the edge 24 of the bed-piece 23 until the beards 20 of the needles 19 come into contact with and are closed by the edge 24 thereof. The cam $a$, Fig. 6, coacting with a spring (not shown, but like the springs 54 and 67, Fig. 4) and roller $c$ and through the arm $b$, rock-shaft 15, arm 57, Fig. 15, link 58, and arm 56, next imparts a downward movement to the sinker-controlling bar 36 until the groove 37 therein engages the lugs 28 of the sinkers 26. Then the cam 66, Fig. 4, coacting with the spring 67 and roller 65 and through the arm 64, rock-shaft 16, arms 61 and 62, moves the sinker-controlling bar 36, and therethrough slides all the sinkers 26 and 29 backward to their farthest limit of travel, as in Fig. 15. Immediately thereafter the same instrumentalities that are enumerated above as having lowered the sinker-controlling bar 36 will raise it to the position shown in Fig. 15, thereby releasing the sinkers 26 and leaving them free to be again slid forward by the jacks 32. While the operations just described were in progress the needle-bar 18 continued its downwad course until the loops $d'$ of the needles 19 had descended between the knocking-over bits 44 and cast off the previous loops over the new loops. Then the same instrumentalities that swung the needle-bar 18 toward and its needles 19 against the edge 24 of the bed-piece 23 will swing it away from the same and to the position shown in Fig. 15, it being understood also that the same instrumentalities that lowered the needle-bar 18 and its needles 19, as set forth above, have restored such parts to the positions, Fig. 15, that they were assumed to occupy at the outset of this description.

$d^2$, Fig. 19, represents stitches in enlarged detail, such as each needle 19 knit during the above-described operations of the machine. Fig. 23 shows the stitches $d^2$ after the needles 19 have passed to their upward limit through them preparatory to knitting again, as in Fig. 15.

A, Fig. 1, is a rod, serving as a track for parts to be described hereinafter, immovably mounted in the brackets A' on the angle-bar 22, Fig. 3. $A^2$, Fig. 9, is another and shorter rod, serving the same purpose as the rod A, immovably mounted in one of the brackets A', parallel with the rod A.

$A^3$, Figs. 1, 9, and 22, is a carriage slidably mounted on the track-rods A $A^2$ by means of circular bearings $A^4$, Figs. 1 and 9, in the lugs $A^5$ $A^6$ $A^7$, depending from such carriage. Into the top of the carriage $A^3$, Fig. 22, slideways $A^8$ $A^9$ $A^{10}$ are cut for purposes to be stated hereinafter.

$A^{11}$ is a pattern-transmitting finger, having a roller $A^{12}$ mounted in the free end thereof and itself slidably mounted in the slideway $A^8$ in the carriage $A^3$. From the rear end of such finger $A^{11}$ projects transversely a member $A^{13}$, Fig. 24, which is provided with upwardly-extending lugs $A^{14}$.

$A^{15}$ is an arm jointed at one end and by means of a pivot $A^{16}$ to the lugs $A^{14}$ and having a block $A^{17}$ rigidly secured to the other end thereof. To the block $A^{17}$ two lugs $A^{18}$ are secured parallel to each other to serve as means for connecting the finger $A^{11}$ with parts to be described hereinafter.

$A^{19}$ is a lug projecting from the carriage $A^3$, to which the arm $A^{15}$ is secured by means of a removable pintle $A^{20}$.

$A^{21}$ $A^{22}$, Fig. 22, are pattern-transmitting fingers slidably mounted in the slideway $A^9$ in the carriage $A^3$.

$A^{23}$ is a locking-slide having a transverse slot $A^{24}$ therein for admitting thereinto the rear end portions of either of the fingers $A^{21}$ $A^{22}$ when desired and movable longitudinally in the slideway $A^{10}$ in the carriage $A^3$.

Figs. 1 and 22 show the finger $A^{21}$ held in operative position against the part $A^{25}$ of the slide $A^{23}$ by means of the tension-spring $A^{26}$, Fig. 1, extending from the pin $A^{27}$ thereon to the pin $A^{28}$ on the part $A^{25}$, Fig. 22, of the locking-slide $A^{23}$. A tension-spring $A^{29}$, Fig. 1, is shown holding the finger $A^{22}$ out of operative position and into the recess $A^{24}$, Fig. 22, in the locking-slide $A^{23}$. Obviously if the slide $A^{23}$ were slid over until the part $A^{25}$ thereof were located immediately behind the finger $A^{22}$ the finger $A^{21}$ could be slid back into and held in the space thus provided by means of the tension-spring $A^{26}$, Fig. 1, and the finger $A^{22}$, Fig. 22, could be held in operative position against the part $A^{25}$ of the slide $A^{23}$ by means of the spring $A^{29}$, Fig. 1. The slide $A^{23}$ may also be slid entirely out of the way of the fingers $A^{21}$ $A^{22}$ and the latter be slid back into and held in the space thus vacated, as is done whenever the finger $A^{11}$ is in action.

B, Figs. 1 and 4, represents arms rigidly secured to the machine-frame.

B' is a rod immovably mounted in the arms B.

$B^2$ is a rock-shaft mounted in bearings in the arms B.

$B^3$ represents arms fast to the rock-shaft $B^2$ and projecting transversely backward therefrom into engagement with the under side of the rod B' when such rock-shaft $B^2$ is supporting the parts carried thereby in the positions shown in Fig. 1.

$B^4$, Figs. 1, 4, and 24, represents arms rigidly and transversely secured by one end of each thereof to the rock-shaft $B^2$.

$B^5$ is a shaft both slidably and rotatably mounted in transverse circular bearings $B^a$ in the free end portions of the arms $B^4$.

$B^6$, Figs. 1 and 24, represents arms rigidly and transversely secured by the upper ends thereof to the longitudinally-slidable rock-shaft $B^5$.

$B^7$ is a rod immovably mounted in the lower end portions of the arms $B^6$.

$B^8$, Figs. 2 and 24, is an arm rigidly secured by its lower end portion to the shaft $B^5$ and projecting upward and engageable by means of an eye $B^9$ in the free end portion thereof in two directions with a stop-pin $B^{10}$ projecting transversely from the arm $B^4$ through such eye $B^9$. The function of the arm $B^8$ and stop $B^{10}$ is to regulate the oscillatory or rocking movement of the rock-shaft $B^5$.

$B^{11}$ represents embroidering-tube-supporting arms rigidly secured by means of set-screws $B^{13}$ to the rod $B^7$.

$B^{14}$ represents embroidering-tubes passing through and securely seated in openings $B^{15}$ in the free end portions of the arms $B^{11}$. The free ends of the embroidering-tubes $B^{14}$ are sufficiently slender to allow them to swing back and forth freely between any two of the knitting-needles 19 of the machine.

$B^{16}$ $B^{17}$ are two rods covered with some soft yielding material $B^{18}$, as knit fabric, the former immovably mounted in the arms $B^4$ and the latter arranged parallel thereto and connected therewith by means of the loops $B^{19}$ and set-screws $B^{20}$ and serving as a tension for the embroidering-threads $B^{21}$.

$B^{22}$, Figs. 14 and 24, is a circular disk, having a transverse engaging slot $B^{23}$ in the periphery thereof and fast mounted on the longitudinally-slidable rock-shaft $B^5$.

$B^{24}$, Figs. 13 and 24, is a circular disk loose mounted on the longitudinally-sliding rock-shaft $B^5$ and having a lug $B^{25}$ narrower than the slot $B^{23}$ in the disk $B^{22}$ projecting into and adapted to engage either side $B^{26}$ $B^{27}$ of such slot $B^{23}$ and also having projecting and countersunk cams $B^{28}$ $B^{29}$, alternating with each other, formed on the end thereof opposite to the lug $B^{25}$.

$B^{30}$, Figs. 9, 11, 12, and 24, is a circular disk loose mounted by means of a socket $B^{b}$ sunk axially thereinto over the end of the longitudinally-sliding rock-shaft $B^{5}$ and having projecting and countersunk cams $B^{31}$ $B^{32}$, alternating with each other, formed on the inner end thereof and also having a hub $B^{33}$ formed on the outer end and terminating in a transverse connecting-lug $B^{34}$, the projecting cams of each disk being preferably counterparts of the countersunk cams of the other.

The disks $B^{22}$, $B^{24}$, and $B^{30}$ constitute a rotary cam mechanism for sliding the rock-shaft $B^{5}$ endwise a distance equal to the width of one knitting-needle 19 at predetermined times.

Figs. 9 and 24 show the pattern-transmitting finger $A^{11}$ operatively connected through the arm $A^{15}$, its block $A^{17}$, the lugs $A^{18}$, the hub $B^{33}$, and transverse connecting-lug $B^{34}$ with the disk $B^{30}$.

$B^{35}$, Figs. 1 and 2, is a tension-spring fast by one end to one of the arms $B^{4}$ and by its other end to a collar $B^{36}$ fast on the longitudinally-slidable rock-shaft $B^{5}$, serving at all times to maintain the disk $B^{22}$ fast to the shaft $B^{5}$ in contact with the disk $B^{24}$ and the latter in contact with the disk $B^{30}$.

The shaft $B^{5}$, arms $B^{6}$, rod $B^{7}$, and arms $B^{11}$ constitute a longitudinally-slidable and transversely-oscillative carrier for the embroidering-tubes $B^{14}$, which carrier is both slidable and oscillative in the bearings $B^{a}$ in the arms $B^{4}$. The longitudinally-reciprocating movements of the shaft $B^{5}$ and the parts carried thereby are controlled by the joint operations of a pattern-wheel (not yet described) acting through either of the pattern-transmitting fingers $A^{11}$ $A^{21}$ $A^{22}$, the arm $A^{15}$, the disk $B^{30}$, connected therewith, and the disks $B^{24}$ $B^{32}$ and the spring $B^{35}$, Figs. 1 and 2. The oscillatory or rocking movement of the shaft $B^{5}$ is sufficient to swing the free ends of the embroidering-tubes $B^{14}$ between and a little higher up than the upper ends of all of the knitting-needles 19 of the machine.

C, Fig. 8, is an arm rigidly secured by its lower end to machine-frame.

$C'$ is a lever jointed at one end and by means of a pivot $C^{2}$ to the upper end portion of the arm C.

$C^{3}$, Fig. 24, is an arm rigidly and transversely secured by its upper end to the shaft $B^{5}$, its lower and free end being provided with a pintle $C^{4}$, projecting transversely therefrom.

$C^{5}$, Figs. 8 and 24, is an arm jointed at its lower end and by means of a pivot $C^{6}$ to the lever $C'$ and extending upward therefrom through a guide (not shown) into engagement with the pintle $C^{4}$ on the arm $C^{3}$.

$C^{7}$, Figs. 2 and 8, is a pintle projecting horizontally from the lever $C'$.

$C^{8}$ is a roller having a shipping-groove $C^{9}$ in the hub $C^{10}$ thereof and mounted loose on the pintle $C^{7}$.

$C^{11}$ is a cam mounted fast on the shaft 10. Each rotation of the cam $C^{11}$ when in engagement with and acting through the roller $C^{8}$, lever $C'$, and arms $C^{5}$ $C^{3}$, oscillates the rock-shaft $B^{5}$ in the direction indicated by the arrow $y$ in Fig. 24. After the rock-shaft $B^{7}$ has carried the embroidering-tubes $B^{14}$ between and above the points of the sewing-needles 19 and the pattern-transmitting finger $A^{11}$ has slid such shaft $B^{5}$ endwise until the embroidering-tubes $B^{14}$ have each passed completely over the end of one needle 19 and the arm $C^{5}$ has descended gravity will cause each embroidering-tube $B^{14}$ to swing backward and return between two needles 19, one being a needle which it passed by in going outward and the other being a needle adjacent thereto, to the position shown in Figs. 15 and 24, the downward limit of travel of the parts carried by the shaft $B^{5}$.

D, Fig. 9, is a pattern-wheel having a driving-ratchet $D'$ extending around the periphery thereof and mounted on a stud-bearing $D^{2}$, projecting from a lug $D^{3}$, Figs. 1 and 3, on the machine-frame. The periphery of the pattern-wheel D is provided with three detachable and interchangable pattern-rings $D^{4}$ $D^{5}$ $D^{6}$, adapted to engage and actuate, respectively, the pattern-transmitting fingers $A^{11}$ $A^{21}$ $A^{22}$ and transmit therethrough their respective patterns to the embroidering devices of the machine.

When the pattern-transmitting finger $A^{11}$ is operative and connected with the longitudinally-slidable rock-shaft $B^{5}$, as in Figs. 2 and 24, the carriage $A^{3}$ will have no function except to provide a way $A^{9}$, Fig. 22, for such finger $A^{11}$ to slide back and forth in and will consequently for the time being remain out of action; but whenever the patterns of either of the pattern-rings $D^{5}$ or $D^{6}$ are required the arm $A^{15}$, Fig. 24, will be disengaged from the lug $B^{34}$, which may then be engaged directly with the slot X, Fig. 25, in the slidable carriage $A^{3}$, and either one of the fingers $A^{21}$ $A^{22}$ may then be engaged with its corresponding pattern-ring, according to the pattern desired, in the manner hereinbefore described. The finger $A^{11}$ will then lie in and travel idly with the carriage $A^{3}$, which will execute the same backward and forward movements as its operative pattern-transmitting finger, either $B^{21}$ or $B^{22}$, and communicate them from such operative finger to the longitudinally-slidable rock-shaft $B^{5}$. Obviously more than three pattern-rings might be mounted on a pattern-wheel if desired, and a correspondingly-increased number of pattern-transmitting fingers be employed therewith; but inasmuch as the pattern-rings are all detachable and interchangeable no particular advantage would accrue from employing a larger number than are here shown.

$D^{7}$, Fig. 9, is a lever jointed at its middle on a fixed pivot $D^{8}$.

$D^{9}$ is a pallet jointed at its lower end and by means of a pivot $D^{10}$ to one end $D^{11}$ of the lever $D^7$ and engaging with its upper end the teeth of the ratchet $D'$ of the pattern-wheel D.

$D^{12}$ is a stud seated in the pallet $D^9$.

$D^{13}$ is a stud seated in the lever $D^7$.

$D^{14}$ is a tension-spring connecting the free ends of the studs $D^{12}$ $D^{13}$ and therethrough yieldingly maintaining the pallet $D^9$ in engagement with its ratchet $D'$.

$D^{15}$ is a stud seated in a fixed bearing and parallel with the lever $D^7$.

$D^{16}$ is a tension-spring connecting the lever $D^7$ with the stud $D^{15}$ and acting through such lever $D^7$ to draw the pawl $D^9$ downward over and into engagement with each succeeding tooth of the ratchet $D'$ to rotate the pattern-wheel D.

$D^{17}$, Figs. 3 and 5, is a horizontal arm jointed at its rear end to a fixed pivot-bearing $D^{18}$.

$D^{19}$, Figs. 1, 3, and 9, is a vertical arm rigidly secured at its lower end to the free end portion of the horizontal arm $D^{17}$ and projecting its free end $D^{20}$ upward against the lower end of the pallet $D^9$, Fig. 9, and the under side of the end $D^{11}$ of the lever $D^7$.

$D^{21}$, Figs. 2 and 3, is a cam fast to the shaft 10.

$D^{22}$ is a roller mounted on the free end portion of the arm $D^{17}$ and is engaged by the cam $D^{21}$. The cam $D^{21}$, acting through the roller $D^{22}$, vertical arm $D^{19}$, and pallet $D^9$, Fig. 9, drives the pattern-wheel D a distance equal to the thickness of one tooth of the ratchet $D'$ at each rotation of the shaft 10.

$D^{23}$, Fig. 2, is a horizontal arm fast to the frame of the machine, having a guide-slot $D^{24}$ therein and provided with a downwardly-projecting lug $D^{25}$.

$D^{26}$, Figs. 1, 2, and 3, is an arm jointed at its lower end portion and by means of a pivot $D^{27}$ to the lug $D^{25}$ on the arm $D^{23}$ and terminating at its upper end in a curved finger $D^{27a}$.

$D^{28}$, Figs. 2 and 8, is a rod extending the whole length of and mounted in the machine-frame, wherein it is longitudinally slidable. The rod $D^{28}$ terminates at its left-hand end in a disk $D^d$, fast thereto, which is held constantly in contact with the arm $D^{26}$ by means of a spring to be described hereinafter.

$D^{29}$ is an arm fast by its upper end to the longitudinally-slidable rod $D^{28}$ and provided at its lower end with a fork $D^{30}$, engaging the groove $C^{19}$, Fig. 8, in the hub $C^{10}$ of the roller $C^8$.

$D^{31}$, Fig. 2, is a spring encircling the rod $D^{28}$, included between a fixed bearing on the machine-frame and a collar $D^{32}$, fast on such rod $D^{28}$. Fig. 2 shows the spring $D^{31}$, acting through the longitudinally-slidable rod $D^{28}$, loosely projected endwise against the arm $D^{26}$, to maintain the finger $D^{27a}$ thereof in the path of the actuating-pins $D^a$ of the pattern-wheel D. The spring $D^{31}$ also normally acts, through the rod $D^{28}$ and arm $D^{29}$, to ship and hold the roller $C^8$ out of engagement with the cam $C^{11}$, which when engaged by and acting through such roller $C^8$, the arms $C^{15}$ $C^3$, and coöperating with the force of gravity, oscillates the longitudinally-slidable rock-shaft $B^5$ and therethrough swings the parts carried thereby up and down.

Whenever the spaces $D^{32}$, Fig. 2, between the radially-projecting lugs $D^{33}$ of a pattern-ring, as $D^4$, are not too deep, the periphery of such pattern-ring will readily traverse the periphery of the roller $A^{12}$ and communicate therethrough its pattern impulses to the pattern-transmitting finger $A^{11}$, whence they will pass intermediately to the longitudinally-sliding rock-shaft $B^5$ in the manner already hereinbefore explained; but when the spaces between the radially-projecting lugs of any pattern-ring, as $D^5$, Fig. 22ª, are too deep to be used successfully with a pattern-transmitting finger like $A^{11}$ fingers like $A^{21}$ $A^{22}$ must be employed. The last-mentioned fingers are identical, and therefore but one of them will be considered here. The form and size of the free end portion of the finger $A^{21}$ should be such that it will pass freely between any two of the radially-projecting lugs of its pattern-ring in order that the end thereof may contact the bottom of the space between any two such radially-projecting lugs. Obviously, however, if the free end portion of the finger $A^{21}$, Fig. 22ª, were resting in the bottom of a space, as $D^{33}$, between two lugs, as $D^{34}$ $D^{35}$, on its cam-ring $D^5$ the finger $D^{21}$ would either prevent the rotation of the pattern-wheel D or break it or be itself broken. Mechanism for obviating the difficulty under consideration will now be described.

E, Fig. 9, is a vertical slideway extending through a part $E'$, rigidly connected with the machine-frame.

$E^2$, Figs. 9, 22, and 22ª, is a slide having a cam $E^3$ formed on one side thereof and mounted in the slideway E.

$E^4$ is a cam, the counterpart of the cam $E^3$ on the slide $E^2$, formed in a cut-away portion $E^5$, Fig. 22, of the carriage $A^3$.

$E^6$, Figs. 2, 3, and 5, is a cam fast to one end of the body portion of the cam $D^{21}$.

$E^7$ is a horizontal arm jointed at its rear end to a fixed pivot-bearing $D^{18}$.

$E^8$, Figs. 2, 3, and 9, is a vertical arm rigidly secured at its lower end to the free end portion of the horizontal arm $E^7$ and projecting upward against the lower end of a downward extension $E^9$ of the slide $E^2$.

$E^{10}$, Figs. 2 and 3, is a roller mounted on the free end portion of the horizontal arm $E^7$ and engageable by the cam $E^6$.

$E^{11}$, Fig. 9, is a pintle projecting inward through a vertical slot $E^a$ in the side of the slideway $E'$ and seated in the slide $E^2$.

$E^{12}$ is a fixed bearing on the part $E'$.

$E^{13}$ is a tension-spring normally acting to maintain the slide $E^2$ at its lowest limit of travel in the slideway $E'$.

$E^{14}$ is a fixed bearing on the part $E'$.

$E^{15}$ is a fixed bearing on the slidable carriage $A^3$.

$E^{16}$ is a tension-spring connecting the fixed bearings $E^{14}$ $E^{15}$ on the part $E'$ and carriage $A^3$, respectively, and normally acting to slide the carriage $A^3$ on its tracks $A$ $A^2$ in the direction indicated by the arrow $e$.

The remaining and unlettered parts of the machine (being mainly the devices constituting the narrowing mechanism thereof) should be disregarded. Such parts are shown in the drawings for the reason that they could not well be omitted therefrom without representing the knitting-machine proper too much mutilated to illustrate my invention to the best advantage, as already hereinbefore stated.

At each rotation of the cam $D^{21}$, Figs. 2 and 3, the cam $E^6$, carried thereby and acting through the roller $E^{10}$ and arm $E^8$, will force the slide $E^2$, Figs. 9, 22, and $22^a$, upward, thereby causing the cam $E^3$ thereon to engage the cam $E^4$ on the carriage $A^3$, and therethrough slide the latter in the direction indicated by the arrow $e'$, Fig. 9, until the free end of the pattern-transmitting finger $A^{21}$, Fig. $22^a$, is drawn out of the space $D^{33}$ in its pattern-ring $D^5$ sufficiently to allow the pallet $D^9$ to turn the pattern-wheel $D$ a distance equal to the thickness of one tooth of the ratchet $D'$, when the spring $E^{13}$, Fig. 9, will force the slide $E^2$ downward to its lowest limit of travel, and the spring $E^{16}$, acting through the carriage $A^3$, will throw the free end of the pattern-transmitting finger $A^{21}$ against the end of the lug $D^{34}$ on the pattern-ring $D^5$. At the next succeeding rotation of the cams $D^{21}$ $E^6$ a like series of operations will take place, with the result, however, that when the carriage $A^3$, with its pattern-transmitting finger $A^{21}$, is next released by the descent of the slide $E^2$ the free end of such finger $A^{21}$ will slide into and rest against the bottom of the space $D^{36}$, Fig. $22^a$, in the cam-ring $D^5$, and whenever the pattern-ring $D$ is to be advanced a notch the pattern-transmitting finger $A^{21}$ or $A^{22}$ in engagement therewith will be first disengaged therefrom in the manner already described. Fig. 2 shows the cam $D^{21}$ engaging the roller $D^{22}$, and so long as this engagement continues and such cam is rotated the pallet $D^9$ will be longitudinally reciprocated and drive the pattern-wheel $D$. The cam $E^6$ is also here shown in engagement with the roller $E^{10}$, and so long as this engagement continues or the cam $E^6$ remains in its path and is rotated the slide $E^2$ will be longitudinally reciprocated and the pattern-wheel $D$ will be transmitting a pattern through one of the pattern-transmitting fingers; but until the roller $C^8$ is engaged by the cam $C^{11}$ the above-mentioned movements of the pattern-wheel $D$, carriage $A^3$, and its pattern-transmitting fingers will be but idle. The actuating-pins $D^a$ have their inner ends exteriorly threaded to adapt them to be turned into corresponding transverse interiorly-threaded sockets in the pattern-wheel $D$. The pins $D^a$ may be arranged and set in a continuous circular series or in segmental groups, as in Fig. 2. If the pattern-wheel $D$ were provided with a continuous series of actuating-pins $D^a$, the operation of embroidering would be continuous; but when such pins $D^a$ are arranged in segmental groups, as in Fig. 2, such operation will be intermittent. If the pattern-wheel $D$ should be now rotated, the pins $D^a$, impinging against the point of the finger $D^{27a}$ of the arm $D^{26}$, and acting therethrough and through the longitudinally-sliding rod $D^{28}$ and arm $D^{29}$ and against the resistance of the spring $D^{31}$, would throw the roller $C^8$ into engagement with the cam $C^{11}$ on the shaft 10. So long as the point of the finger $D^{27a}$ of the arm $D^{26}$ is being traversed by a circular series or segmental group of pins $D^a$ the roller $C^8$ will continue in engagement with the cam $C^{11}$.

F, Fig. 1, is a stocking in process of knitting and at the same time having a pattern six times duplicated embroidered thereon. The ornamentation appears on the under side of the fabric of the stocking F. The length of the pattern to be embroidered will depend upon the number and arrangement of the actuating-pins $D^a$ of the pattern-wheel $D$ and the extent to which the latter is operated. The width and variations in width of any pattern will depend upon the varying lengths of the radially-projecting lugs, as $D^{34}$ $D^{35}$, Fig. $22^a$, of any pattern-ring, as $D^5$, and also upon the varying depths of the spaces, as $D^{33}$, between such lugs.

Supposing the machine to be knitting fabric F which is to be embroidered contemporaneously with its production, the operation of the embroidering mechanism will be as follows: The cam $E^6$, acting through the roller $E^{10}$, arm $E^8$, and extension $E^9$ of the slide $E^2$, will force the latter upward against the cam $E^4$, Fig. $22^a$, and therethrough slide the carriage $A^3$ and its pattern-transmitting finger $A^{21}$ in the direction indicated by the arrow $e'$, Fig. 9, until the latter has moved far enough away from the pattern-ring $D^5$, Fig. $22^a$, of the pattern-wheel $D$ to permit the end of the lug $D^{35}$ thereon to pass upward opposite to and register with the free end of such finger $A^{21}$. As soon as the finger $A^{21}$ is withdrawn from the path of the lug $D^{35}$ the pallet $D^9$, impelled by the cam $D^{21}$, acting through the roller $D^{22}$ and arm $D^{19}$, will turn the pattern-wheel $D$ one notch, thereby causing the end of the lug $D^{35}$ to pass upward opposite to and register with the free end of the finger $A^{21}$. The slide $E^2$ will then be caused to descend by the action of the spring $E^{13}$, Fig. 9, and the spring $E^{16}$ will thereupon slide the carriage $A^3$ in the direction indicated by the arrow $e$ until it is halted by the free end of the finger $A^{21}$ registering and meeting with the end of the lug $D^{35}$ on the pattern-ring $D^5$. The lug $D^{35}$, Fig. $22^a$, will now, acting through the pattern-transmitting finger $A^{21}$, its carriage $A^3$, and the longitudinally-sliding rock-shaft $B^5$ and against the resistance of the spring $E^{16}$, stop and maintain the embroidering-tubes $B^{14}$ in proper positions to carry loops $d^3$, Fig. 23, of embroidering material, around seven knitting-needles 19 to start the pattern to be embroidered on the fabric F, Fig. 1, it being remembered that it was proposed to have a design, as F', embroidered thereon seven times. Thereupon the cam $C^{11}$, Figs. 1 and 8, engaging with the roller $C^8$ and acting through the arm $C'$, will force the arm $C^5$, Fig. 24, upward against the pintle $C^4$, which will transmit such upward impulse through the arm $C^3$ to the rock-shaft $B^5$ and rock the same in the direction indicated by the arrow $y$. Such rocking of the shaft $B^5$, acting through the arms $B^6$, rod $B^7$, and arms $B^{11}$, will swing the free ends of the embroidering-tubes $B^{14}$ between and a little higher up than the upper ends $d'$, Fig. 15, of the needles 19. The rock-shaft $B^5$, Fig. 24, will continue to swing the embroidering-tubes $B^{14}$ still in the direction indicated by the arrow $y$ until the cams $B^{28}$ of the disk $B^{24}$ are forced up onto the cams $B^{31}$ of the disk $B^{30}$, as in Fig. 25. The effect of the joint operation of such cams $B^{28}$ $B^{31}$ is to slide the rock-shaft $B^5$ endwise a distance equal to the length of the cams $B^{28}$ on the cam-disk $B^{24}$ and sufficiently to carry the free end of each embroidering-tube $B^{14}$ along over across and beyond the top of one needle 19. Thereupon the arm $C^5$, having descended and released the rock-shaft $B^5$, the spring $B^{35}$, Figs. 1 and 2, together with the force of gravity, will swing the embroidering-tubes $B^{14}$ downward and backward between the needles 19 and will immediately thereafter slide such rock-shaft $B^5$, embroidering-tubes $B^{14}$, and the cam-disk $B^{24}$ back endwise to their orginal positions, as in Fig. 24. The dotted line $y'$ in the diagrammatic view Fig. 23ª clearly indicates the path traveled by the free end of each embroidering-tube $B^{14}$ while placing a loop of embroidering material $d^3$, Fig. 23, about one of the needles 19. After seven such loops $d^3$ have been passed around the proper and a like number of needles 19 a line of thread $d$, Fig. 15, will be paid out by the knitting-thread carrier 48, and all the needles 19 of the machine will then knit such thread $d$ in the manner already described, and the needles about which the loops $d^3$, Fig. 23, of embroidery-thread $B^{21}$ have been passed will knit such loops $d^3$ and their proper portions of the knitting-thread $d$ into the fabric F. One stitch G, Fig. 21, of embroidery will have been placed on each of the seven designs F', Fig. 1, by the operations just described. The parts of the machine and its embroidering mechanism are now all in position to knit another row of stitches $d^2$, Figs. 19, 20, and 23, and also to knit into the fabric F, Fig. 1, seven more embroidery-stitches like G, Fig. 21. As the machine continues to knit G' will be the second stitch embroidered on each of the seven like designs F' on the fabric F. Fig. 21 shows the right side of one of the seven designs F' being embroidered on the fabric F, and the letters from G to $G^{12}$, inclusive, indicate by their exponents the order in which the embroidering-stitches are knit into such fabric.

What I claim as new, and desire to secure by Letters Patent, is—

1. In mechanism of the class described, in combination, the needles of the knitting-machine and means for actuating the same, a longitudinally-slidable rock-shaft, a plurality of embroidering-tubes mounted transversely and mediately on such rock-shaft, a longitudinally-slidable carriage, a pattern-wheel mounted on a fixed bearing and a pattern-transmitting finger mounted on the longitudinally-slidable carriage and adapted to transmit pattern impulses from such pattern-wheel—through the longitudinally-slidable rock-shaft—to the embroidering-tubes, a rotary cam for sliding the rock-shaft endwise a distance equal to the width of one knitting-needle, whereby each tube is adapted to carry a thread of embroidering material around a certain and predetermined one of said knitting-needles, substantially as described and for the purpose specified.

2. In mechanism of the class described, in combination, the knitting-needles of the machine and means for supporting and operating the same, a longitudinally-slidable rock-shaft, a plurality of embroidering-tubes mounted transversely to and mediately on such rock-shaft, a longitudinally-slidable carriage, a pattern-wheel mounted on a fixed bearing, a pattern-transmitting finger mounted on the longitudinally-slidable carriage and adapted to transmit pattern impulses from such pattern-wheel to the longitudinally-slidable rock-shaft, and means for transversely oscillating such rock-shaft and also for actuating the pattern-wheel and longitudinally-slidable carriage with its pattern-transmitting finger, a rotary cam for sliding the rock-shaft endwise a distance equal to the width of one knitting-needle, whereby each embroidering-tube is adapted to carry a thread of embroidering material around a certain and predetermined one of said knitting-needles, substantially as described and for the purpose specified.

3. In mechanism of the class described, in combination, the knitting-needles of the machine and means for supporting and actuating the same, a longitudinally-slidable rock-shaft, a plurality of embroidering-tubes mounted mediately thereon, a pattern-transmitting finger having a roller mounted in the free end thereof and connected directly with the longitudinally-slidable rock-shaft, and a pattern-wheel mounted on a fixed bearing and adapted to communicate pattern impulses through the roller in the free end of the pattern-transmitting finger to such finger, and thence to the longitudinally-slidable rockshaft, a rotary cam for sliding the rock-shaft endwise a distance equal to the width of one knitting-needle, whereby each embroidering-tube is adapted to carry a thread of embroidering material around one of said knitting-needles, substantially as described and for the purpose specified.

4. In mechanism of the class described, in combination, the knitting-needles of the machine and means for supporting and actuating the same, a longitudinally-slidable rock-shaft, a plurality of embroidering-tubes mounted mediately thereon, a pattern-transmitting finger having a roller mounted in the free end thereof and connected directly with the longitudinally-slidable rock-shaft, a pattern-wheel mounted on a fixed bearing and adapted to communicate pattern impulses through the roller in the free end of the pattern-transmitting finger to such finger, and thence to the longitudinally-slidable rock-shaft and means for transversely oscillating the rock-shaft and also for actuating the pattern-wheel, a rotary cam for sliding the rock-shaft endwise a distance equal to the width of one knitting-needle, whereby each embroidering-tube is adapted to carry a thread of embroidering material around one of said knitting-needles, substantially as described and for the purpose specified.

5. In mechanism of the class described, in combination, the knitting-needles of the machine and means for supporting and actuating such needles, a longitudinally-slidable rock-shaft, a plurality of embroidering-tubes rigidly and transversely connected with such rock-shaft, a longitudinally-slidable carriage, a pattern-wheel mounted on a fixed bearing, a pattern-transmitting finger mounted on the longitudinally-slidable carriage and adapted to transmit pattern impulses from such pattern-wheel to the longitudinally-slidable rock-shaft, and means for transversely oscillating such rock-shaft and also for actuating the pattern-wheel and longitudinally-slidable carriage with its pattern-transmitting finger, a rotary cam for sliding the rock-shaft endwise a distance equal to the width of one knitting-needle, whereby each embroidering-tube is adapted to carry a thread of embroidering material around one of said knitting-needles, substantially as described and for the purpose specified.

6. In mechanism of the class described, in combination, the needles of the knitting-machine and means for actuating the same, a longitudinally-slidable rock-shaft, a plurality of embroidering-tubes mediately mounted thereon, a longitudinally-slidable carriage, a pattern-wheel mounted on a fixed bearing, a pattern-transmitting finger mounted on the longitudinally-slidable carriage and adapted to transmit pattern impulses from such pattern-wheel to the longitudinally-slidable rock-shaft, a pallet, a slide and an arm—for communicating motion to the pattern-wheel, the longitudinally-slidable carriage and the longitudinally-slidable rock-shaft, respectively—a cam-shaft and three cams mounted fast thereon and arranged and adapted to actuate said pallet, slide and arm, a rotary cam for sliding the rock-shaft endwise a distance equal to the width of one knitting-needle, whereby each embroidering-tube is adapted to carry a thread of embroidering material around a certain and predetermined one of said knitting-needles, substantially as described and for the purpose specified.

7. In mechanism of the class described, in combination, the needles of the knitting-machine and means for supporting and actuating the same, a longitudinally-slidable rock-shaft, a plurality of embroidering-tubes rigidly and transversely connected therewith and each arranged and adapted to carry a thread of embroidering material around one of the knitting-needles, rotary cam mechanism mounted on and adapted to slide said rock-shaft endwise—each time after the pattern-wheel has acted thereon—to carry the embroidering-tubes across and over the points of the knitting-needles around which embroidering-threads are to be placed—after such embroidering-tubes have been swung between and higher up than the points of the knitting-needles—and means for transversely oscillating such rock-shaft, substantially as described and for the purpose specified.

8. In mechanism of the class described, in combination, a longitudinally-slidable carriage, the needles of a knitting-machine and means for supporting and actuating the same, a longitudinally-slidable rock-shaft, a plurality of embroidering-tubes rigidly and transversely connected therewith and each arranged and adapted to carry a thread of embroidering material around one of such knitting-needles, a disk fast mounted on the rock-shaft and having a transverse engaging slot in the periphery thereof, a disk loose mounted on the rock-shaft and having a lug thereon—narrower than the slot in the first-mentioned disk and projecting into the slot therein and adapted to engage either side thereof—and also having projecting and countersunk cams, alternating with each other, formed on the end of such second-mentioned disk, opposite to the lug thereon, a disk loose mounted—by means of a socket sunk transversely thereinto—on the rock-shaft and having projecting and countersunk cams alternating with each other, formed on the inner end thereof—the projecting cams of each disk being preferably counterparts of the countersunk cams of the other—and also having a hub, formed on the outer end of the last-mentioned disk, terminating in a transverse connecting-lug engaging with the longitudinally-slidable carriage and means for transversely oscillating such rock-shaft, substantially as described and for the purpose specified.

9. In mechanism of the class described, in combination, a supporting-frame, parallel tracks $A$ $A^2$ supported thereby, a longitudinally-slidable carriage $A^3$ mounted on such tracks, a pattern-transmitting finger $A^{21}$ mounted on such carriage, a pattern-wheel $D$ having a driving-ratchet $D'$ extending around the periphery thereof and provided with a pattern-ring $D^5$ adapted to engage and actuate the pattern-transmitting finger $A^{21}$ and transmit therethrough pattern impulses to the longitudinally-slidable carriage $A^3$, a pallet $D^9$ adapted to engage the ratchet $D'$, of the pattern-wheel $D$, and therethrough drive the same, a slide $E^2$—mounted in a slideway $E'$—having a cam $E^3$ formed thereon adapted to engage the cam $E^4$—in the carriage $A^3$—and therethrough longitudinally slide such carriage $A^3$, at regular intervals, during all the time that the pattern-wheel $D$ is being driven, the cam-shaft 10, the cams $D^{21}$ and $E^6$ carried thereby, the pivoted arms $D^{17}$ and $E^7$, with their rollers $D^{22}$ and $E^{10}$ engaging the cams $D^{21}$ and $E^6$, and means for transmitting the impulses received by such rollers from such cams to the pallet $D^9$ and slide $E^2$, substantially as described and for the purpose specified.

10. In mechanism of the class described, in combination, the knitting-needles 19 of the machine and means for supporting and actuating the same, the longitudinally-slidable rock-shaft $B^5$, arms $B^6$ secured to and projecting transversely from the rock-shaft $B^5$, the rod $B^7$ carried by the arms $B^6$, the arms $B^{11}$ rigidly and transversely secured to the rod $B^7$, the embroidering-tubes $B^{14}$ seated in the free end portions of the arms $B^{11}$, the arm $C^3$ rigidly and transversely secured to the rock-shaft $B^5$, the cam-shaft 10, the cam $C^{11}$ mounted thereon, the lever $C'$ pivoted by one end to a fixed bearing, the arm $C^5$ jointed, at its lower end, to the lever $C'$ and extending upward into mediate engagement with the free end portion of the arm $C^5$, and the roller $C^8$ mounted on the lever $C'$ and adapted to engage and be actuated by the cam $C^{11}$ on the cam-shaft 10, substantially as described and for the purpose specified.

11. In mechanism of the class described, in combination, a supporting-frame, parallel tracks $A'$ $A^2$ supported thereby, a longitudinally-slidable carriage $A^3$ mounted thereon, a pattern-transmitting finger $A^{21}$, mounted on such carriage, a pattern-wheel $D$ having a driving-ratchet $D'$ extending around the periphery thereof and provided with a pattern-ring $D^5$ adapted to engage and actuate the pattern-transmitting finger $A^{21}$ and transmit therethrough pattern impulses to the longitudinally-slidable carriage $A^3$, a pallet $D^9$ adapted to engage the ratchet $D'$, of the pattern-wheel $D$, and therethrough drive the same, a slide $E^2$—mounted in a slideway $E'$—having a cam $E^3$ formed thereon adapted to engage the cam $E^4$—in the carriage $A^3$—and therethrough longitudinally slide such carriage, at regular intervals, during all the time that the pattern-wheel $D$ is being driven, the knitting-needles 19 of the machine and means for actuating the same, the longitudinally-slidable rock-shaft $B^5$, the arms $B^6$ secured to and projecting transversely from the rock-shaft $B^5$, the rod $B^7$ carried by the arms $B^6$, the arms $B^{11}$ rigidly and transversely secured to the rod $B^7$, the embroidering-tubes $B^{14}$ seated in the free end portions of the arms $B^{11}$, the arm $C^3$ rigidly and transversely secured to the rock-shaft $B^5$, the cam-shaft 10, the cams $C^{11}$ $D^{21}$ $E^6$ carried thereby, the pivoted lever $C'$ and pivoted arms $D^{17}$ $E^7$ with their rollers $C^8$ $D^{22}$ $E^{10}$ engaging the cams $C^{11}$ $D^{21}$ $E^6$, respectively, and means for transmitting the impulses received by such rollers from such cams to the pallet $D^9$, the slide $E^2$ and arm $D^{29}$, substantially as described and for the purpose specified.

In testimony whereof I have signed my name to this specification in the presence of two subscribing witnesses.

EDUARD RICHARD THIERFELDER.

Witnesses:
JAMES BALEY,
CHAS. F. COOPER.